No. 681,022. Patented Aug. 20, 1901.
S. HENDERSON & W. TAYLOR.
OVERSHOE FOR HORSES.
(Application filed Apr. 29, 1901.)
(No Model.)
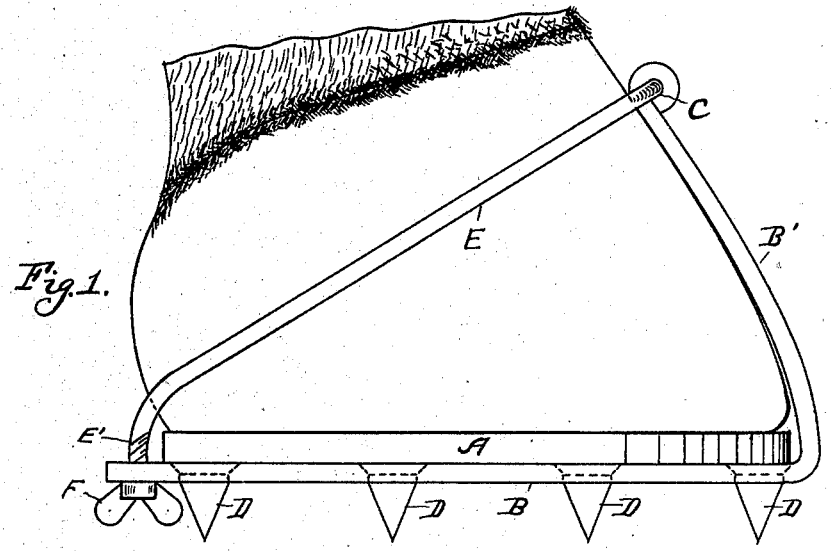
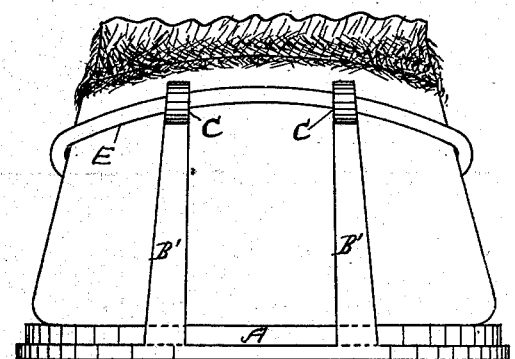
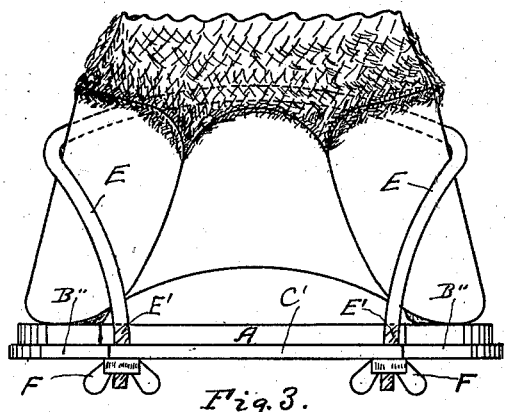
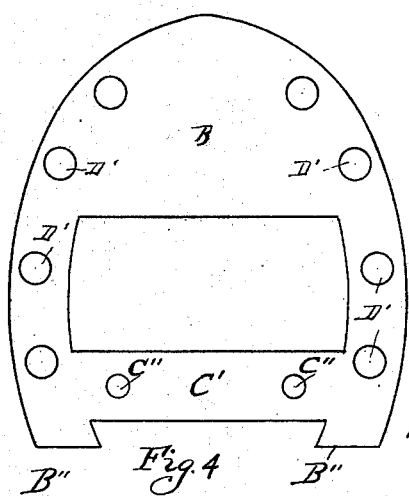
WITNESSES
INVENTORS.
ATTORNEY.

UNITED STATES PATENT OFFICE.

SAMUEL HENDERSON AND WINSTON TAYLOR, OF DAYTON, OHIO.

OVERSHOE FOR HORSES.

SPECIFICATION forming part of Letters Patent No. 681,022, dated August 20, 1901.

Application filed April 29, 1901. Serial No. 57,908. (No model.)

*To all whom it may concern:*

Be it known that we, SAMUEL HENDERSON and WINSTON TAYLOR, citizens of the United States, residing at Dayton, in the county of Montgomery and State of Ohio, have invented certain new and useful Improvements in Overshoes for Horses; and we do declare the following to be a full, clear, and exact description of the invention, such as will enable others skilled in the art to which it appertains to make and use the same, reference being had to the accompanying drawings, and to the letters of reference marked thereon, which form a part of this specification.

Our invention comprises an overshoe for horses.

The object of the invention is to provide a shoe of the above description which may be worn over the usual horseshoe when ice and sleet are on the ground and whereby the horse wearing the same will be prevented from slipping.

The invention possesses the novel features hereinafter described and claimed.

Referring to the accompanying drawings, Figure 1 is a side elevation of a horse's foot, showing our improved overshoe attached thereto. Fig. 2 is a front elevation of the same. Fig. 3 is a rear elevation of the same. Fig. 4 is a plan view of the overshoe.

In a detail description of our invention similar reference characters indicate corresponding parts.

A designates a common horseshoe applied to a horse's hoof in the usual manner.

B designates our improved overshoe, which is adapted to be placed against the shoe A and is made somewhat larger than said shoe A. This overshoe B has extending from the front portion thereof two upwardly-projected bars B', which are integral parts of the overshoe and which bars have at their upper ends openings or eyes C. The shoe B, of which the parts B' are integral, as hereinbefore stated, is stamped out of sheet metal—such, for example, as boiler-plate—and said bars B' are bent upwardly, as shown in Fig. 1, to conform to the surface of a horse's hoof. The rearward ends or heels B'' of the overshoe project back beyond the heels of the shoe A and are joined by a cross-bar C', in which there are two openings C''.

D designates a series of spikes or ice-creepers, which are loosely projected through openings D' in the overshoe B and are held securely in position by the pressure on the shoe A, which rests against the heads of said spikes.

E designates a metallic strap or band, which is secured to the upper ends of the bars B' by being passed through the eyes or openings C therein and is carried obliquely around the horse's hoof rearwardly, where it is secured in the transverse bar C'. It will be observed from Fig. 3 that this strap or band is carried well around the heel of the hoof on each side and is carried on the inside of the heels of the horseshoe A and is thence passed through the opening C'' in the bar C'. Owing to this manner of connecting said strap at the rear of the horse's hoof, any possibility of the back ends of said strap slipping downwardly on the hoof is avoided. The ends of the band or strap are screw-threaded, as at E', and are tightened by means of thumb-nuts F, which fit against the lower side of the bar C'. The overshoe B may be made in the form of a solid plate, in which case it would inclose entirely the lower surface of the hoof, or a portion thereof may be stamped out, as shown in Fig. 4, to lighten the same.

An important advantage of this overshoe lies in the fact that it may be quickly applied without removing the regular horseshoes. It may be applied by any one, as it requires no special tools.

A set of these overshoes may be carried in a vehicle, and when a farmer or other person travels to distant points in cold weather such overshoes may be applied in case of emergency—for example, when the ground becomes covered with ice, sleet, &c.

Having described our invention, we claim—

1. An overshoe for horses, stamped from sheet metal and adapted to fit against the usual horseshoe, the said overshoe having two upwardly-extending bars adapted to fit against the front of the hoof, the said bars having eyes formed in their upper ends, a metallic clamping band or strap passing through said eyes and extending obliquely on each side of the hoof, the ends of said clamping band or strap being screw-threaded and passed through openings in the heel of said overshoe, the ends of said band lying between the heels of the horseshoe proper, and tightening-nuts securing the ends of said band, substantially as shown and described.

2. In an overshoe for horses, the combination with a metallic overshoe adapted to be placed below the usual horseshoe, a series of ice-creepers loosely mounted in said overshoe and maintained in position by the usual horseshoe which rests against the upper ends thereof, bars extending from said overshoe, a metallic band secured to the upper ends of said bars and to the rear of said overshoe at points between the heels or rearward projections of the horseshoe proper, and means for tightening said metallic band, as herein shown and described.

In testimony whereof we affix our signatures in presence of two witnesses.

SAMUEL HENDERSON.
WINSTON TAYLOR.

Witnesses:
R. J. McCARTY,
JOHN W. KALBFUS.